United States Patent
Enomoto et al.

(10) Patent No.: US 11,011,808 B2
(45) Date of Patent: May 18, 2021

(54) ENERGY STORAGE DEVICE AND METHOD FOR MANUFACTURING ENERGY STORAGE DEVICE

(71) Applicant: Lithium Energy and Power GmbH & Co. KG, Stuttgart (DE)

(72) Inventors: Yukio Enomoto, Kyoto (JP); Ashley Canning, Kyoto (JP)

(73) Assignees: GS YUASA INTERNATIONAL LTD., Kyoto (JP); ROBERT BOSCH GMBH, Stuttgart (DE)

( * ) Notice: Subject to any disclaimer, the term of this patent is extended or adjusted under 35 U.S.C. 154(b) by 226 days.

(21) Appl. No.: 16/080,606

(22) PCT Filed: Jan. 18, 2017

(86) PCT No.: PCT/EP2017/050990
§ 371 (c)(1),
(2) Date: Aug. 28, 2018

(87) PCT Pub. No.: WO2017/148612
PCT Pub. Date: Sep. 8, 2017

(65) Prior Publication Data
US 2019/0067670 A1    Feb. 28, 2019

(30) Foreign Application Priority Data
Feb. 29, 2016    (JP) ............... JP2016-038466

(51) Int. Cl.
*H01M 50/54*    (2021.01)
*H01M 10/05*    (2010.01)
*H01M 50/538*    (2021.01)
*H01M 10/0525*    (2010.01)
*H01M 10/058*    (2010.01)

(52) U.S. Cl.
CPC ........... *H01M 50/54* (2021.01); *H01M 10/05* (2013.01); *H01M 10/058* (2013.01); *H01M 10/0525* (2013.01); *H01M 50/538* (2021.01); *H01M 2250/20* (2013.01); *Y02T 90/40* (2013.01)

(58) Field of Classification Search
CPC ...... H01M 2/263; H01M 2/266; H01M 10/05; H01M 10/0525; H01M 2250/20; H01M 50/538; H01M 50/54; Y02T 90/32; Y02E 60/10
See application file for complete search history.

(56) References Cited

FOREIGN PATENT DOCUMENTS

| JP | 2001-293522 A | 10/2001 |
| JP | 2005-183332 | * 7/2005 |
| JP | 2016-219122 A | 12/2016 |
| WO | WO 2013/125153 A1 | 8/2013 |

OTHER PUBLICATIONS

Machine translation of JP 2005-183332, published on Jul. 7, 2005 (Year: 2005).*
Machine translation of JP 2001-293522, published on Oct. 23, 2001 (Year: 2001).*
Definition of Arcuate at Dictionary.com, 2020, available online at https://www.dictionary.com/browse/arcuate (Year: 2020).*

* cited by examiner

*Primary Examiner* — Anca Eoff
(74) *Attorney, Agent, or Firm* — McGinn I.P. Law Group, PLLC.

(57) ABSTRACT

An energy storage device, includes a terminal; an electrode assembly having a body portion and a tab portion projecting from the body portion; and a current collector electrically connecting the terminal and the tab portion with each other. The current collector is configured such that a plate portion and a second plate portion which opposedly face each other are continuously formed with each other with curved portion interposed therebetween, and a thickness of the curved portion is set smaller than a thickness of the first plate portion and a thickness of the second plate portion.

3 Claims, 5 Drawing Sheets

ENERGY STORAGE DEVICE AND METHOD FOR MANUFACTURING ENERGY STORAGE DEVICE

CROSS-REFERENCE TO RELATED APPLICATIONS

The present application is a National Stage filing under 35 USC 371 of the International Application No. PCT/EP2017/050990, filed on Jan. 18, 2017, which is based on Japanese Patent Application No. 2016-038466, filed on Feb. 29, 2016, the entire contents of which are incorporated herein by reference.

TECHNICAL FIELD

The present invention relates to an energy storage device and a method for manufacturing an energy storage device.

BACKGROUND ART

Conventionally, there has been known an energy storage device where a tab portion of an electrode assembly and a terminal are electrically connected to each other through a current collector. For example, Patent Document 1 discloses a configuration where a current collector connected to a tab portion is bent and, thereafter, the current collector is connected to a terminal.

PRIOR ART DOCUMENT

Patent Document

Patent Document 1: JP-A-2012-181941

SUMMARY OF THE INVENTION

Problems to be Solved by the Invention

To realize efficient housing of an electrode assembly in a limited space defined in a container, a technique of forming a current collector in a compact shape has been studied. To form the current collector in a compact shape, a technique has been studied where a thickness of the current collector as a whole is made small by folding a bent portion. However, when the bent portion is folded, the bent portion forms an acute angle and hence, stress generated by vibration is concentrated at such a portion causing cracks to occur in the portion. As a result, stability of the energy storage device per se is lowered.

Accordingly, the present invention has been made to overcome the above-mentioned drawbacks, and it is an object of the present invention to provide an energy storage device which can realize stabilization of the energy storage device while forming a current collector per se in a compact shape.

Means for Solving the Problems

To achieve the above-mentioned object, according to one aspect of the present invention, there is provided an energy storage device which includes: a terminal; an electrode assembly having a body portion and tab portions projecting from the body portion; and a current collector electrically connecting the terminal and the tab portion with each other, wherein the current collector is configured such that a first plate portion and a second plate portion which opposedly face each other are continuously formed with each other with a curved portion interposed therebetween, and a thickness of the curved portion is set smaller than a thickness of the first plate portion and a thickness of the second plate portion.

With such a configuration, the bent portion of the current collector between the first plate portion and the second plate portion is formed into the curved portion and hence, the stress concentration at the curved portion can be suppressed, whereby the occurrence of cracks can be suppressed. Further, the thickness of the curved portion is smaller than the thickness of the first plate portion and the thickness of the second plate portion and hence, it is possible to make the first plate portion and the second plate portion opposedly face each other substantially in parallel to each other, whereby the current collector can be made thin as a whole.

Accordingly, it is possible to realize the stabilization of the energy storage device while forming the current collector per se in a compact shape.

A width of a space defined by an inner surface of the curved portion in a direction that the first plate portion and the second plate portion opposedly face each other may be set larger than a distance between a distal end of the first plate portion and a distal end of the second plate portion in the direction that the first plate portion and the second plate portion opposedly face each other.

With such a configuration, the thickness of the curved portion is smaller than the thickness of the first plate portion and the thickness of the second plate portion and hence, a width of a space defined by the inner surface of the curved portion can be set larger than the distance between the distal end of the first plate portion and the distal end of the second plate portion. That is, it is possible to make the first plate portion and the second plate portion approach to each other and hence, the current collector can be formed in a more compact shape.

Both end portions of the inner surface of the curved portion may respectively have an inclined surface inclined in a straight line shape in cross section.

With such a configuration, both end portions of the inner surface of the curved portion respectively have the inclined surface and hence, it is possible to prevent the bent portion from making an acute angle. Accordingly, the stress concentration at the bent portion can be suppressed and hence, the occurrence of cracks can be suppressed.

At least a portion of the inner surface of the curved portion may have an arcuate shape in cross section.

With such a configuration, the inner surface of the curved portion is formed into an arcuate shape in cross section and hence, the curved portion per se can be formed into a smoothly curved shape. Accordingly, the stress concentration at the curved portion can be more effectively suppressed and hence, the occurrence of cracks can be more effectively suppressed.

According to another aspect of the present invention, there is provided a method for manufacturing the energy storage device, wherein the method includes a step of forming the current collector by bending a plate body having a flat plate shape, and the curved portion is formed by bending a first region having a smaller wall thickness than other regions of the plate body.

With such a configuration, the method can acquire the advantageous effect equivalent to that of the above-mentioned energy storage device.

An inclined portion where the wall thickness is gradually decreased toward the first region may be formed on a boundary between the first region and other regions of the plate body.

With such a configuration, the inclined portion is formed on the boundary between the first region and other regions of the plate body and hence, even when the curved portion is formed by bending the plate body, the bent portion minimally forms an acute angle. Accordingly, the stress concentration at the bent portion can be suppressed and hence, the occurrence of cracks can be suppressed.

A recessed portion may be formed on a surface of the first region of the plate body which forms the inner surface of the curved portion.

With such a configuration, the recessed portion is formed on the surface of the plate body which forms the inner surface of the curved portion and hence, the inner surface of the curved portion can be formed into a partially opened arcuate shape in cross section simply by bending the plate body.

Advantages of the Invention

According to the present invention, it is possible to realize the stabilization of an energy storage device while forming a current collector per se in a compact shape.

MODE FOR CARRYING OUT THE INVENTION

Hereinafter, an energy storage device according to an embodiment of the present invention is described with reference to drawings. The respective drawings are schematic views, and the energy storage device is not always illustrated with strict accuracy.

The embodiment described hereinafter is an embodiment showing one specific example of the present invention. In the embodiment described hereinafter, shapes, materials, constitutional elements, arrangement positions and connection states of the constitutional elements, the order of manufacturing steps and the like are merely examples, and these are not intended to be used for limiting the present invention. Further, out of the constitutional elements in the embodiment described hereinafter, the constitutional elements which are not described in independent claims describing the uppermost concept are described as arbitrary constitutional elements.

First, the overall configuration of an energy storage device 10 according to an embodiment is described with reference to FIG. 1 to FIG. 3.

Figure 1:
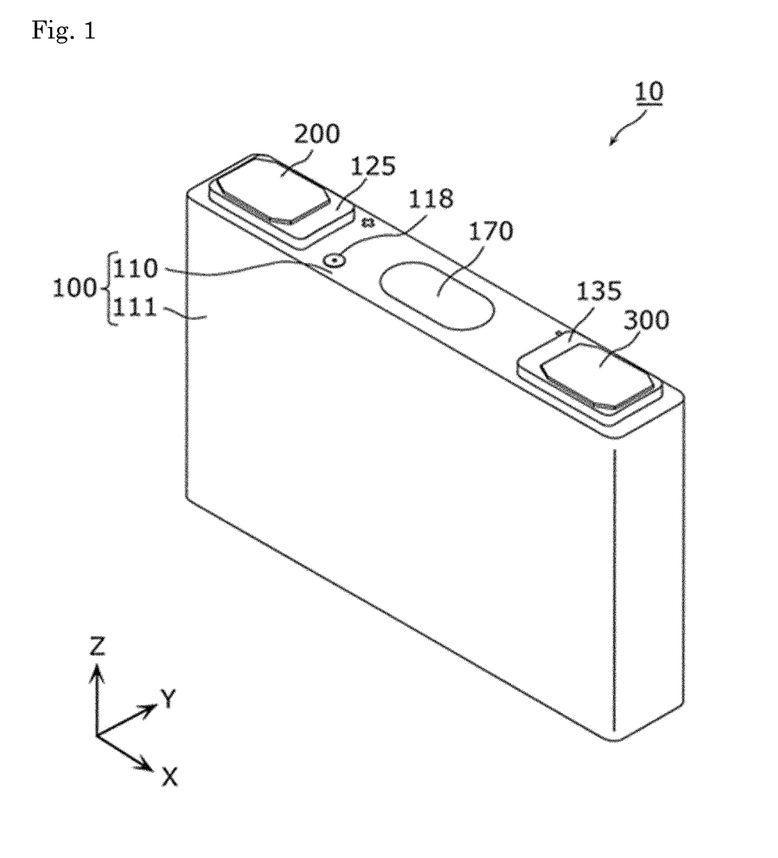
FIG. 1 is a perspective view showing an external appearance of an energy storage device according to an embodiment.

FIG. 1 is a perspective view showing an external appearance of the energy storage device 10 according to the embodiment. FIG. 2 is an exploded perspective view of the energy storage device 10 according to the embodiment. FIG. 3 is an exploded perspective view of a lid structural body 180 according to the embodiment.

In FIG. 1 and subsequent drawings which follow FIG. 1, for the sake of convenience of the description, the description is made assuming a Z axis direction as a vertical direction. However, in an actual use mode of the energy storage device 10, there may be a case where the Z axis direction does not agree with the vertical direction.

The energy storage device 10 is a secondary battery capable of charging and discharging electricity. To be more specific, the energy storage device 10 is a nonaqueous electrolyte secondary battery such as a lithium ion secondary battery. The energy storage device 10 is applicable to an electric vehicle (EV), a hybrid electric vehicle (HEV), a plug-in hybrid electric vehicle (PHEV) or the like. The energy storage device 10 is not limited to a nonaqueous electrolyte secondary battery, and may be a secondary battery other than a nonaqueous electrolyte secondary battery, or may be a capacitor.

As shown in FIG. 1, the energy storage device 10 includes a container 100, a positive electrode terminal 200, and a negative electrode terminal 300. As shown in FIG. 2, an electrode assembly 400 is housed in the container 100, and a lid structural body 180 is disposed above the electrode assembly 400.

The lid structural body 180 includes a lid plate 110 of the container 100, current collectors, and insulation members. To be more specific, the lid structural body 180 includes a positive electrode current collector 140 which is electrically connected to a tab portion 410 disposed on a positive electrode side of the electrode assembly 400 as the current collector. In the same manner, the lid structural body 180 includes a negative electrode current collector 150 which is electrically connected to a tab portion 420 disposed on a negative electrode side of the electrode assembly 400 as the current collector.

The lid structural body 180 also includes a lower insulation member 120 disposed between the lid plate 110 and the positive electrode current collector 140 as the insulation member. In the same manner, the lid structural body 180 includes a lower insulation member 130 disposed between the lid plate 110 and the negative electrode current collector 150 as the insulation member.

The lid structural body 180 according to this embodiment further includes: a positive electrode terminal 200; a negative electrode terminal 300, an upper insulation member 125; and an upper insulation member 135.

The upper insulation member 125 is disposed between the lid plate 110 and the positive electrode terminal 200. The upper insulation member 135 is disposed between the lid plate 110 and the negative electrode terminal 300.

An upper spacer 500 and a buffer sheet 600 are disposed between the lid structural body 180 having the above-mentioned configuration and the electrode assembly 400.

The upper spacer 500 is disposed between a side of the electrode assembly 400 on which the tab portions 410 and 420 are formed and the lid plate 110. To be more specific, the upper spacer 500 has a flat plate shape as a whole, and has two insertion portions 520 into which the tab portions 410 and 420 are inserted. In this embodiment, the insertion portions 520 are formed on the upper spacer 500 in a notched shape. The upper spacer 500 is formed using a material having an insulation property such as polycarbonate (PC), polypropylene (PP), polyethylene (PE) or polyphenylene sulfide resin (PPS), for example.

For example, the upper spacer 500 functions as a member which directly or indirectly restricts the movement of the electrode assembly 400 in the upward direction (the direction toward the lid plate 110), or as a member which prevents short-circuiting between the lid structural body 180 and the electrode assembly 400.

The buffer sheet 600 is a member which is formed using a porous material having high flexibility such as polyethylene foam, and functions as a buffer material between the electrode assembly 400 and the upper spacer 500.

In this embodiment, side spacers 700 are disposed between side surfaces (both side surfaces in the X axis direction in this embodiment) of the electrode assembly 400 in the direction which intersects with the direction that the electrode assembly 400 and the lid plate 110 are disposed in a row (Z axis direction) and inner peripheral surfaces of the container 100. The side spacers 700 play a role of restricting the position of the electrode assembly 400, for example. In the same manner as the upper spacer 500, the side spacers 700 are formed using a material having an insulation property such as PC, PP, PE or PPS, for example.

Figure 2:
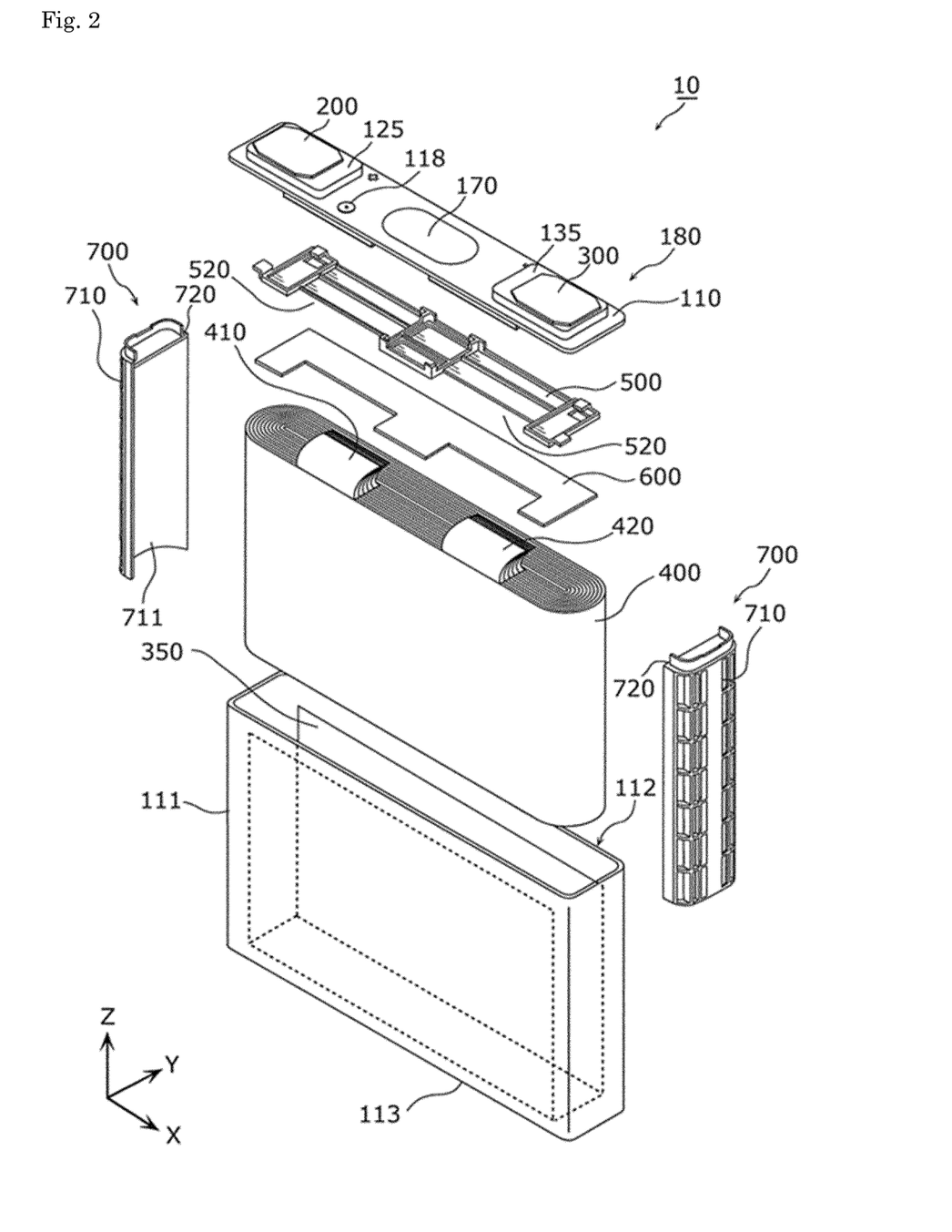
FIG. 2 is an exploded perspective view of the energy storage device according to the embodiment.
Figure 3:
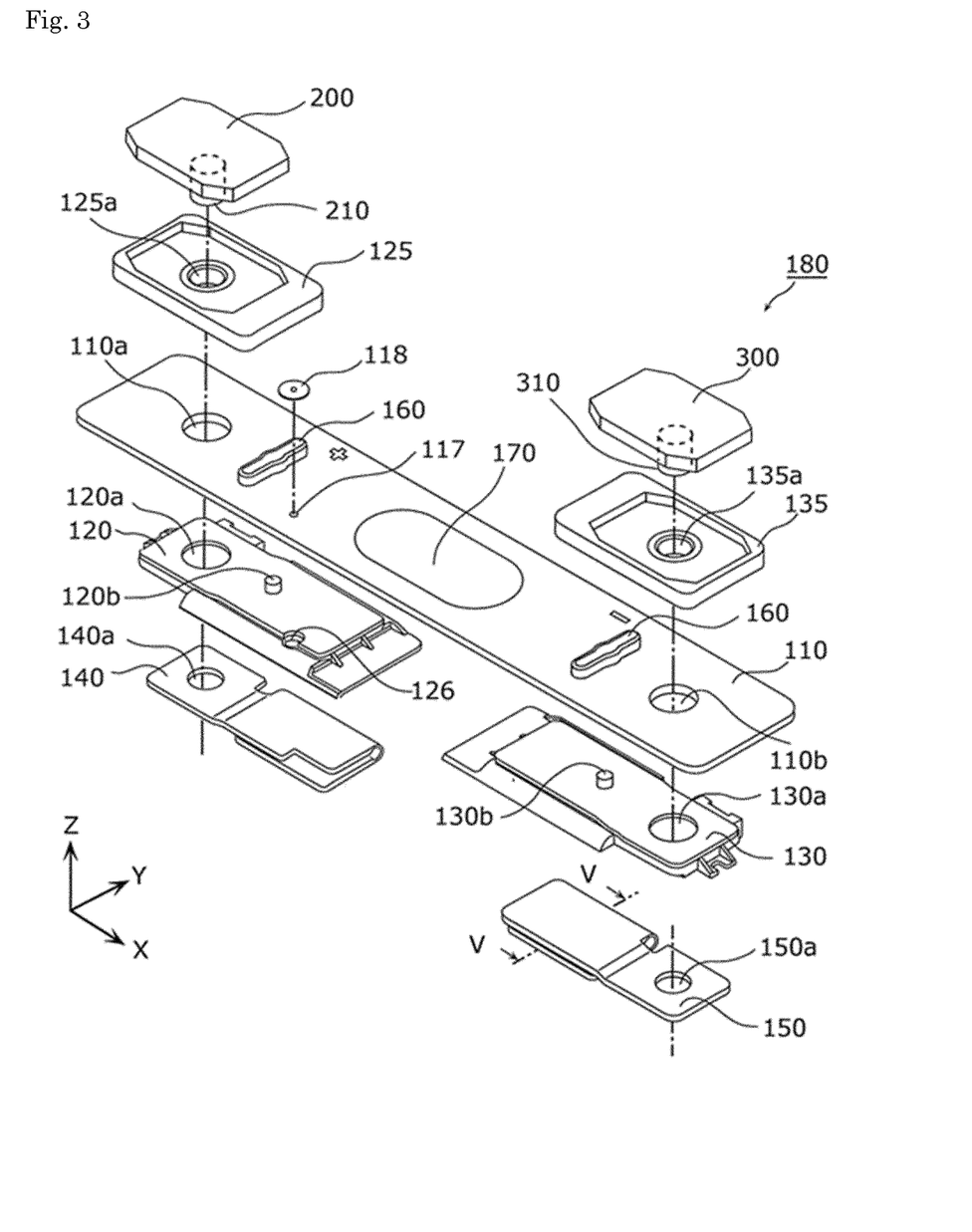
FIG. 3 is an exploded perspective view of a lid plate structural body according to the embodiment.

In addition to constitutional elements shown in FIG. 1 to FIG. 3, the energy storage device 10 may include other constitutional elements such as a buffer sheet disposed between the electrode assembly 400 and a bottom 113 of the container 100 (body 111). Although an electrolyte solution (nonaqueous electrolyte) is filled in the container 100 of the energy storage device 10, the illustration of the electrolyte solution is omitted.

The container 100 includes the body 111 and the lid plate 110. Although a material for forming the body 111 and a material for forming the lid plate 110 are not particularly limited, it is preferable that the body 111 and the lid plate 110 be made of weldable metal such as stainless steel, aluminum or an aluminum alloy, for example.

The body 111 is a cylindrical body having a rectangular shape as viewed in a plan view. The body 111 has an opening 112 on one end portion thereof and has the bottom 113 on the other end portion thereof. At the time of assembling the energy storage device 10, the electrode assembly 400, the side spacers 700 and the like are inserted into the body 111 of the container 100 through the opening 112. The direction that the electrode assembly 400, the side spacers 700 and the like are inserted into the body 111 through the opening 112 is assumed as the insertion direction (Z axis direction).

An insulation sheet 350 which covers the electrode assembly 400 is disposed in the inside of the body 111. The insulation sheet 350 is formed using a material having an insulation property such as PC, PP, PE or PPS, for example. The insulation sheet 350 is made to overlap with inner peripheral surfaces of the body 111, and is positioned between the electrode assembly 400 and the body 111. To be more specific, the insulation sheet 350 is disposed so as to overlap with a pair of inner peripheral surfaces of the body 111 which forms long sides of the opening 112 as viewed in a plan view and an inner surface of the bottom 113.

The body 111 is configured such that the electrode assembly 400, the insulation sheet 350 and the like are housed in the inside of the body 111 and, thereafter, the lid plate 110 is welded to the body 111 so that the inside of the body 111 is hermetically sealed.

The lid plate 110 is a plate-like member which closes the opening 112 of the body 111. As shown in FIG. 2 and FIG. 3, a gas release vent 170, an electrolyte solution filling port 117, through holes 110a and 110b, and two bulging portions 160 are formed on the lid plate 110. The gas release vent 170 is opened when an internal pressure of the container 100 is increased so that the gas release vent 170 plays a role of releasing a gas in the inside of the container 100.

The electrolyte solution filling port 117 is a through hole through which an electrolyte solution is filled in the container 100 at the time of manufacturing the energy storage device 10. An electrolyte solution filling plug 118 is disposed on the lid plate 110 so as to close the electrolyte solution filling port 117. That is, at the time of manufacturing the energy storage device 10, an electrolyte solution is filled in the container 100 through the electrolyte solution filling port 117, and the electrolyte solution filling port 117 is closed by welding the electrolyte solution filling plug 118 to the lid plate 110 so that the electrolyte solution is stored in the container 100.

A kind of electrolyte solution sealed in the container 100 is not particularly limited provided that the performance of the energy storage device 10 is not impaired, and various electrolyte solutions can be selectively used.

In this embodiment, two respective bulging portions 160 are formed on the lid plate 110 by forming portions of the lid plate 110 into a bulged shape. The bulging portions 160 are used for positioning the upper insulation member 125 or 135, for example. A recessed portion (not shown in the drawing) which is indented upward is formed on a back side of the bulging portion 160, and an engaging projection 120b of the lower insulation member 120 or an engaging projection 130b of the lower insulation member 130 is engaged with a portion of the recessed portion. With such a configuration, the lower insulation member 120 or 130 is also positioned, and is fixed to the lid plate 110 in such a state.

The upper insulation member 125 is a member which electrically insulates the positive electrode terminal 200 and the lid plate 110 from each other. The lower insulation member 120 is a member which electrically insulates the positive electrode current collector 140 and the lid plate 110 from each other. The upper insulation member 135 is a member which electrically insulates the negative electrode terminal 300 and the lid plate 110 from each other. The lower insulation member 130 is a member which electrically insulates the negative electrode current collector 150 and the lid plate 110 from each other. The upper insulation members 125 and 135 each may be also referred to as an upper gasket, for example. The lower insulation members 120 and 130 each may be also referred to as a lower gasket, for example. That is, in this embodiment, the upper insulation members 125 and 135 and the lower insulation members 120 and 130 also have a function of sealing a space between the electrode terminal (200 or 300) and the container 100.

In the same manner as the upper spacer 500, the upper insulation members 125 and 135, and the lower insulation members 120 and 130 are formed using a material having an insulation property such as PC, PP, PE or PPS, for example.

As shown in FIG. 3, the engaging projection 130b which engages with the bulging portion 160 projects from an upper surface of the lower insulation member 130. Further, a recessed portion is formed on a lower surface of the lower insulation member 130, and the negative electrode current collector 150 is housed in the recessed portion. A through hole 130a which communicates with a through hole 150a formed in the negative electrode current collector 150 is formed in one end portion of the lower insulation member 130. A fastening portion 310 of the negative electrode terminal 300 is inserted into the through holes 130a, 150a.

The engaging projection 120b which engages with the bulging portion 160 projects from an upper surface of the lower insulation member 120. Further, a recessed portion is formed on a lower surface of the lower insulation member 120, and the positive electrode current collector 140 is housed in the recessed portion. A through hole 120a which communicates with a through hole 140a formed in the positive electrode current collector 140 is formed in one end portion of the lower insulation member 120. A fastening portion 210 of the positive electrode terminal 200 is inserted into the through holes 120a, 140a. Further, a through hole 126 is formed in a portion of the lower insulation member 120 positioned directly below the electrolyte solution filling port 117. The through hole 126 guides an electrolyte solution which flows through the electrolyte solution filling port 117 in the direction toward the electrode assembly 400.

As shown in FIG. 1 to FIG. 3, the positive electrode terminal 200 is an electrode terminal electrically connected to a positive electrode of the electrode assembly 400 through the positive electrode current collector 140. The negative electrode terminal 300 is an electrode terminal electrically connected to a negative electrode of the electrode assembly 400 through the negative electrode current collector 150. That is, the positive electrode terminal 200 and the negative electrode terminal 300 are metal-made electrode terminals through which electricity stored in the electrode assembly 400 is discharged to a space outside the energy storage device 10, or through which electricity is introduced into a space inside the energy storage device 10 for storing the electricity in the electrode assembly 400. The positive electrode terminal 200 and the negative electrode terminal 300 are made of metal such as aluminum or an aluminum alloy.

The fastening portion 210 for fastening the container 100 and the positive electrode current collector 140 with each other is formed on the positive electrode terminal 200. The fastening portion 310 for fastening the container 100 and the negative electrode current collector 150 with each other is formed on the negative electrode terminal 300.

The fastening portion 210 is a shaft member (rivet) extending downward from the positive electrode terminal 200. The fastening portion 210 is inserted into the through hole 140a formed in the positive electrode current collector 140, and fastens the positive electrode terminal 200 and the positive electrode current collector 140 together by caulking. To be more specific, the fastening portion 210 is inserted into the through hole 125a formed in the upper insulation member 125, the through hole 110a formed in the lid plate 110, the through hole 120a formed in the lower insulation member 120, and the through hole 140a formed in the positive electrode current collector 140, and fastens the positive electrode terminal 200, the upper insulation member 125, the lid plate 110, the lower insulation member 120 and the positive electrode current collector 140 together by caulking. With such a configuration, the positive electrode terminal 200 and the positive electrode current collector 140 are electrically connected to each other, and the positive electrode current collector 140 is fixed to the lid plate 110 together with the positive electrode terminal 200, the upper insulation member 125 and the lower insulation member 120.

The fastening portion 310 is a shaft member (rivet) extending downward from the negative electrode terminal 300. The fastening portion 310 is inserted into the through hole 150a formed in the negative electrode current collector 150, and fastens the negative electrode terminal 300 and the negative electrode current collector 150 together by caulking. To be more specific, the fastening portion 310 is inserted into the through hole 135a formed in the upper insulation member 135, the through hole 110b formed in the lid plate 110, the through hole 130a formed in the lower insulation member 130, and the through hole 150a formed in the negative electrode current collector 150, and fastens the negative electrode terminal 300, the upper insulation member 135, the lid plate 110, the lower insulation member 130, and the negative electrode current collector 150 together by caulking. With such a configuration, the negative electrode terminal 300 and the negative electrode current collector 150 are electrically connected to each other, and the negative electrode current collector 150 is fixed to the lid plate 110 together with the negative electrode terminal 300, the upper insulation member 135 and the lower insulation member 130.

The fastening portion 310 may be formed as an integral part of the negative electrode terminal 300. Alternatively, the fastening portion 310 may be formed as a part separate from the negative electrode terminal 300 and be fixed to the negative electrode terminal 300 by a technique such as caulking or welding. The fastening portion 310 may be made of metal such as copper or copper alloy which differs from metal for forming the negative electrode terminal 300. The same goes for the relationship in material between the fastening portion 210 and the positive electrode terminal 200.

The positive electrode current collector 140 is a member disposed between the electrode assembly 400 and the container 100 for electrically connecting the electrode assembly 400 and the positive electrode terminal 200 to each other. The positive electrode current collector 140 is made of metal such as aluminum or an aluminum alloy. To be more specific, the positive electrode current collector 140 is electrically connected to the tab portion 410 on a positive electrode side of the electrode assembly 400 and, at the same time, is electrically connected to the fastening portion 210 of the positive electrode terminal 200.

The negative electrode current collector 150 is a member disposed between the electrode assembly 400 and the container 100 for electrically connecting the electrode assembly 400 and the negative electrode terminal 300 to each other. The negative electrode current collector 150 is made of metal such as copper or a copper alloy. To be more specific, the negative electrode current collector 150 is electrically connected to the tab portion 420 on a negative electrode side of the electrode assembly 400 and, at the same time, is electrically connected to the fastening portion 310 of the negative electrode terminal 300.

The shape of the negative electrode current collector 150 is described in detail hereinafter.

Figure 4:
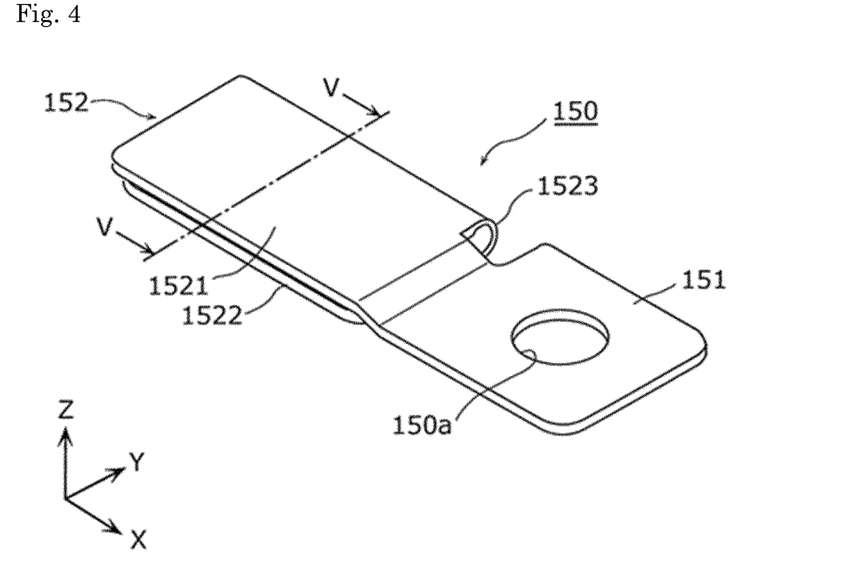
FIG. 4 is a perspective view showing a schematic configuration of a negative electrode current collector according to the embodiment.
Figure 5:
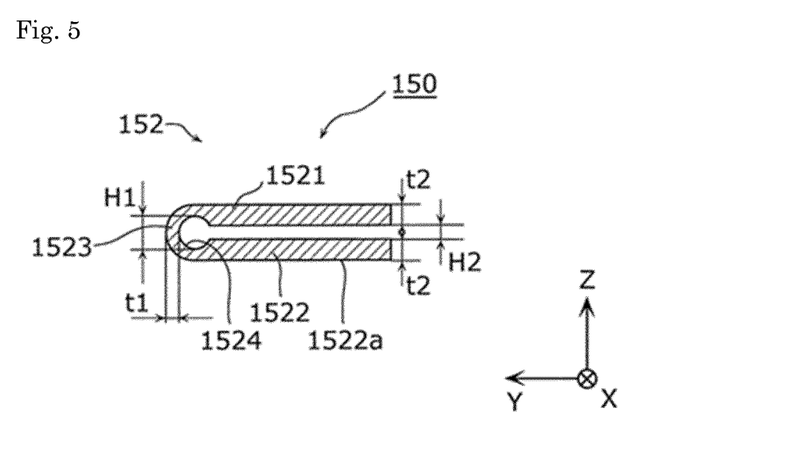
FIG. 5 is a cross-sectional view of the negative electrode current collector according to the embodiment taken along a line V-V in FIG. 4 included in a Y-Z plane.

FIG. 4 is a perspective view showing the schematic configuration of the negative electrode current collector 150 according to the embodiment. FIG. 5 is a cross-sectional view of the negative electrode current collector 150 according to the embodiment taken along a line V-V in FIG. 4 included in a Y-Z plane.

As shown in FIG. 4, the negative electrode current collector 150 is a metal plate, and includes: a first connecting portion 151 connected to the negative electrode terminal 300; and a second connecting portion 152 connected to the tab portion 420 on the negative electrode side.

The first connecting portion 151 is formed into a flat plate shape, and a through hole 150a is formed in the center of the first connecting portion 151. One end portion of the first connecting portion 151 is joined to the second connecting portion 152 in a state where one end portion of the first connecting portion 151 is inclined.

As shown in FIG. 4 and FIG. 5, the second connecting portion 152 is formed into a U shape as viewed from a side. To be more specific, the second connecting portion 152 includes a first plate portion 1521 and a second plate portion 1522 which oppositely face each other with a predetermined distance therebetween. An edge portion of the first plate portion 1521 and an edge portion of the second plate portion 1522 are connected to each other continuously. Such a continuously connected portion forms a curved portion 1523. At least a portion of an inner surface 1524 of the curved portion 1523 has an arcuate shape in cross section.

Figure 6:
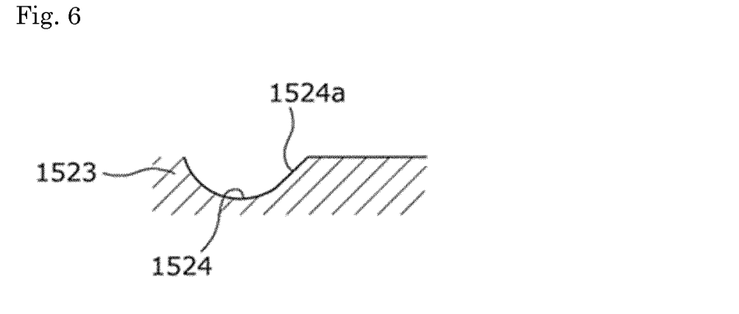
FIG. 6 is a cross-sectional view showing a portion of an inner surface of a curved portion according to the embodiment in an enlarged manner.

FIG. 6 is a cross-sectional view showing the portion of the inner surface 1524 of the curved portion 1523 according to the embodiment in an enlarged manner. As shown in FIG. 6, one end portion of the inner surface 1524 has an inclined surface 1524a inclined in a straight line shape in cross section. The other end portion of the inner surface 1524 has the same shape. A portion of the inner surface 1523 disposed between both end portions of the inner surface 1523 has an arcuate shape in cross section.

As shown in FIG. 5, a thickness t1 of the curved portion 1523 is set smaller than a thickness t2 of the first plate portion 1521 and a thickness t2 of the second plate portion 1522. Further, a width H1 of a space defined by an inner surface of the curved portion 1523 in the direction that the first plate portion 1521 and the second plate portion 1522 oppositely face each other (Z axis direction) is set larger than a distance H2 between a distal end of the first plate portion 1521 and a distal end of the second plate portion 1522 in the direction that the first plate portion 1521 and the second plate portion 1522 oppositely face each other. In this embodiment, the distal end of the first plate portion 1521 is an edge portion of the first plate portion 1521 on a side opposite to the curved portion 1523. In the same manner, the distal end of the second plate portion 1522 is an edge portion of the second plate portion 1522 on a side opposite to the curved portion 1523. As shown in FIG. 5, it is preferable that the first plate portion 1521 and the second plate portion 1522 be disposed approximately in parallel to each other.

In this manner, a bent portion formed between the first plate portion 1521 and the second plate portion 1522 is formed into the curved portion 1523 and hence, the stress concentration at the curved portion 1523 can be suppressed, whereby the occurrence of cracks can be suppressed. Further, the inner surface 1524 of the curved portion 1523 is formed into an arcuate shape in cross section and hence, the stress concentration at the curved portion 1523 can be more effectively suppressed, whereby the occurrence of cracks can be further suppressed.

Further, the thickness t1 of the curved portion 1523 is set smaller than the thickness t2 of the first plate portion 1521 and the thickness t2 of the second plate portion 1522 and hence, it is possible to make the first plate portion 1521 and the second plate portion 1522 oppositely face each other substantially in parallel to each other and to hold the first plate portion 1521 and the second plate portion 1522 in such a state, whereby it is possible to suppress the occurrence of springback. Accordingly, the negative electrode current collector 150 can be made thin as a whole. Further, when the thickness t1 and the thickness t2 are set equal to each other, there may be a case where the negative electrode current collector 150 cannot be bent at a desired position. However, by setting the thickness t1 smaller than the thickness t2 as in the case of this embodiment, the negative electrode current collector 150 can be bent at a desired position.

Further, the thickness t1 of the curved portion 1523 is set smaller than the thickness t2 of the first plate portion 1521 and the thickness t2 of the second plate portion 1522. Accordingly, the width H1 of the space defined by the inner surface 1524 of the curved portion 1523 can be set larger than the distance H2 between the distal end of the first plate portion 1521 and the distal end of the second plate portion 1522. That is, it is possible to make the first plate portion 1521 and the second plate portion 1522 approach to each other and hence, the negative electrode current collector 150 can be formed in a more compact shape.

The first plate portion 1521 is disposed above the second plate portion 1522, and is brought into contact with the lower insulation member 130. One end portion of the first connecting portion 151 is joined to the first plate portion 1521. On the other hand, the tab portion 420 of the electrode assembly 400 is fixed by welding to a main surface 1522a of the second plate portion 1522 on a side opposite to the first plate portion 1521.

With respect to the specific shape of the positive electrode current collector 140, the positive electrode current collector 140 has substantially the same shape as the negative electrode current collector 150 and hence, the description of the shape of the positive electrode current collector 140 is omitted.

Next, the configuration of the electrode assembly 400 is described with reference to FIG. 7.

Figure 7:
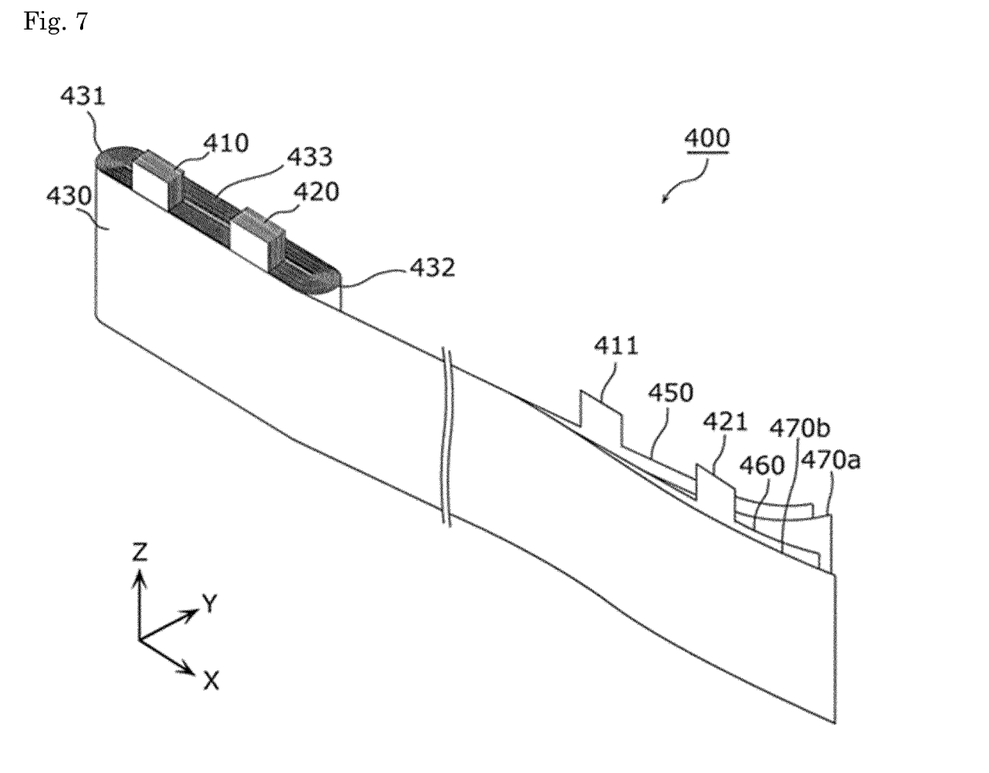
FIG. 7 is a perspective view showing a configuration of an electrode assembly according to the embodiment.

FIG. 7 is a perspective view showing the configuration of the electrode assembly 400 according to the embodiment. FIG. 7 shows the electrode assembly 400 in a wound state in a partially developed manner.

The electrode assembly 400 is a power generating element which can store electricity. The electrode assembly 400 is formed such that a positive electrode 450, a negative electrode 460 and separators 470a and 470b are alternately stacked with each other and wound around together. That is, the electrode assembly 400 is formed such that the positive electrode 450, the separator 470a, the negative electrode 460, and the separator 470b are stacked with each other in this order and, then, are wound around together so as to form an elongated circular shape in cross section.

The positive electrode 450 is a plate where a positive active material layer is formed on surfaces of a positive electrode substrate layer formed using a metal foil having an elongated strip shape and made of aluminum, an aluminum alloy or the like. As a positive active material used for forming the positive active material layer, known materials can be used as desired provided that the positive active materials can occlude and discharge lithium ions. For example, as a positive active material, a polyanion compound such as $LiMPO_4$, $LiMSiO_4$ or $LiMBO_3$ (M being one kind or two or more kinds of transition metal elements selected from a group consisting of Fe, Ni, Mn, Co and the like), a spinel compound such as lithium titanate or lithium manganese oxide, a lithium transition metal oxide such as $LiMO_2$ (M being one kind or two or more kinds of transition metal elements selected from a group consisting of Fe, Ni, Mn, Co and the like) or the like can be used.

The negative electrode 460 is a plate where a negative active material layer is formed on surfaces of a negative electrode substrate layer formed using a metal foil having an elongated strip shape and made of copper, a copper alloy or the like. As a negative active material used for forming the negative active material layer, known materials can be used as desired provided that the negative active materials can occlude and discharge lithium ions. For example, as a negative active material, in addition to lithium metal and a lithium alloy (an alloy containing lithium metal such as lithium-aluminum, lithium-lead, lithium-tin, lithium-aluminum-tin, lithium-gallium or Wood's alloy), an alloy which can occlude and discharge lithium, a carbon material (for example, graphite, hardly graphitizable carbon, easily graphitizable carbon, low temperature baked carbon, amorphous carbon or the like), a metal oxide, a lithium metal oxide ($Li_4Ti_5O_{12}$ or the like), a polyphosphate compound or the like can be listed.

The separators 470a and 470b each are formed using a microporous sheet made of a resin. As a material for forming the separators 470a and 470b used in the energy storage device 10, known materials can be used as desired, provided that performances of the energy storage device 10 are not deteriorated.

The positive electrode 450 has a plurality of projecting portions 411 projecting outward on one edge thereof in the direction of a winding axis. In the same manner, the negative electrode 460 also has a plurality of projecting portions 421 projecting outward on one edge thereof in the direction of the winding axis. The plurality of projecting portions 411 and the plurality of projecting portions 421 are portions where an active material is not applied by coating so that a substrate layer is exposed (active material non-coated portions).

The winding axis is an imaginary axis which is used as a center axis at the time of winding the positive electrode 450, the negative electrode 460 and the like. In this embodiment, the winding axis is a straight line which passes the center of the electrode assembly 400 and extends parallel to the Z axis direction.

The plurality of projecting portions 411 and the plurality of projecting portions 421 are disposed on an edge of the positive electrode 450 and an edge of the negative electrode 460 on the same side in the direction of the winding axis (edges on a plus side in the Z axis direction in FIG. 7). When the positive electrode 450 and the negative electrode 460 are stacked with each other, the plurality of projecting portions 411 and the plurality of projecting portions 421 are respectively stacked with each other at predetermined positions in the electrode assembly 400. To be more specific, by stacking the positive electrode 450 by winding, the plurality of projecting portions 411 are stacked on one edge of the positive electrode 450 in the direction of the winding axis at a predetermined position in the circumferential direction. Further, by stacking the negative electrode 460 by winding, the plurality of projecting portions 421 are stacked on one edge of the negative electrode 460 in the direction of the winding axis at a predetermined position in the circumferential direction which differs from the position where the plurality of projecting portions 411 are stacked.

As a result, the tab portion 410 formed by stacking the plurality of projecting portions 411 and the tab portion 420 formed by stacking the plurality of projecting portions 421 are formed on the electrode assembly 400. The tab portion 410 is gathered toward the center in the stacking direction, for example, and is bonded to the positive electrode current collector 140 by ultrasonic welding, for example. The tab portion 420 is gathered toward the center in the stacking direction, for example, and is bonded to the negative electrode current collector 150 by ultrasonic welding, for example.

The tab portion (410, 420) is a portion through which electricity is introduced into and discharged from the electrode assembly 400, and may be referred to as "lead (portion)", "current collecting portion" or the like.

In this embodiment, the tab portion 410 is formed by stacking the projecting portions 411 where the substrate layer is exposed and hence, the tab portion 410 does not contribute to the generation of electricity. In the same manner, the tab portion 420 is formed by stacking the projecting portions 421 where the substrate layer is exposed and hence, the tab portion 420 does not contribute to the generation of electricity. On the other hand, portions of the electrode assembly 400 other than the tab portions 410 and 420 are formed by stacking portions where an active material is applied to the substrate layer by coating and hence, such portions contribute to the generation of electricity. Hereinafter, such a portion is referred to as "body portion 430". Both end portions of the body portion 430 in the X axis direction form curved portions 431 and 432 each of which has a curved outer peripheral surface. Portions of the electrode assembly 400 disposed between the curved portions 431 and 432 form flat portions 433 having a flat outer side surface. As described above, the electrode assembly 400 is formed into an elongated circular shape where the flat portions 433 are disposed between two curved portions 431 and 432.

Next, the specific configuration of the side spacer 700 is described.

As shown in FIG. 2, the side spacers 700 which cover the side portions of the electrode assembly 400 are elongated members extending in the insertion direction (Z axis direction), and are formed using a material having an insulation property such as PC, PP, PE or PPS. The side spacer 700 includes a wall portion 710 and a proximal portion 720 joined to an upper end portion of the wall portion 710 as integral portions thereof. The wall portion 710 has a lower end portion thereof opened.

The wall portion 710 is a portion which extends along the insertion direction, and covers one side portion of the electrode assembly 400. To be more specific, the wall portion 710 covers the curved portion 431, 432 of the electrode assembly 400 from a side. An inner side surface 711 of the wall portion 710 disposed on an inner side of the container 100 is a surface which opposedly faces the curved portion 431, 432 of the electrode assembly 400, and is formed of a smooth curved surface which corresponds to the curved portion 431, 432.

Next, a method for manufacturing the energy storage device 10 is described.

First, in an electrode assembly forming step, a positive electrode 450, a negative electrode 460, separators 470a and 470b are alternately stacked with each other and are wound around together thus forming an electrode assembly 400 shown in FIG. 6.

After winding of the members is completed, an adhesive tape (not shown in the drawing) is adhered to flat portions 433 of the electrode assembly 400 so as to prevent the developing of the electrode assembly 400.

Figure 8:
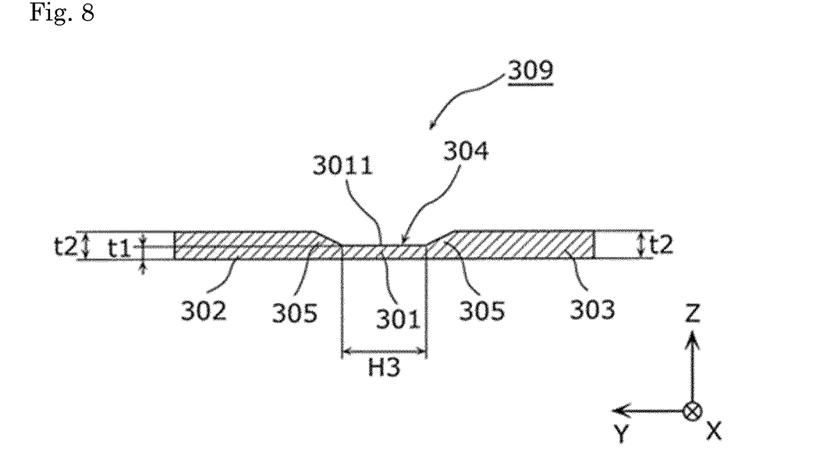
FIG. 8 is a cross-sectional view showing a schematic configuration of a plate body according to the embodiment.

On the other hand, a plate body 309 for forming a negative electrode current collector 150 is prepared.

FIG. 8 is a cross-sectional view showing the schematic configuration of the plate body 309 according to the embodiment. To be more specific, FIG. 8 is a view which corresponds to FIG. 5.

As shown in FIG. 8, the plate body 309 is a plate body having a flat plate shape, and is formed in a shape where the negative electrode current collector 150 is developed. The plate body 309 has a first region 301 having a smaller wall thickness than other regions of the plate body 309. In this embodiment, out of other regions, a region 302 disposed adjacently to one side portion of the first region 301 is a portion which corresponds to a first plate portion 1521, and a region 303 disposed adjacently to the other side portion of the first region 301 is a portion which corresponds to a second plate portion 1522. The first region 301 is a portion which corresponds to a curved portion 1523. Although not shown in FIG. 8, a portion which corresponds to a first connecting portion 151 is joined to the region 302. A through hole 151a is formed in such a portion in advance.

A recessed portion 304 is formed on a surface 3011 of the first region 301 which forms an inner surface 1524 of the curved portion 1523 and hence, the first region 301 has a smaller thickness than other regions 302 and 303. That is, the thickness of the first region corresponds to a thickness t1 of the curved portion 1523, and thicknesses of the other regions 302 and 303 correspond to a thickness t2 of the first plate portion 1521 and a thickness t2 of the second plate portion 1522.

The thickness t1 and the thickness t2 are set corresponding to a material for forming the plate body 309 or a capacity of an energy storage device 10. For example, when the energy storage device 10 is of a type having a large capacity of 20 Ah or more, it is preferable that the thickness t2 be set to approximately 0.4 to 1.2 mm, and the thickness t1 be set to a value which is ⅓ or more and ½ or less of the thickness t2. However, the thickness t1 and the thickness t2 are not limited to those values.

It is preferable that a width H3 of the first region 301 be set to approximately 4 to 5 mm (half or more of a circumference of a circle made by a radius of curvature of an arc which the inner surface of the curved portion 1523 forms, and less than 1.2 times as large as the half of the circumference of the circle). However, the width H3 is not limited to the value.

An inclined portion 305 whose height is gradually decreased toward the first region 301 is formed on a boundary between the first region 301 and the other region 302 and on a boundary between the first region 301 and the other region 303 respectively.

In a lid structural body assembling step, a lid plate 110, a lower insulation member 130, an upper insulation member 135, and a negative electrode terminal 300 are assembled to a portion of the plate body 309 which corresponds to the first connecting portion 151. To be more specific, the plate body 309 is prepared in advance where the first region 301 is bent such that an angle made by the region 302 and the region 303 is set to approximately 90 degrees. Then, a fastening portion 310 of the negative electrode terminal 300 is inserted into a through hole 135a formed in the upper insulation member 135, a through hole 110b formed in the lid plate 110, a through hole 130a formed in the lower insulation member 130, and a through hole 150a formed in the plate body 309, and the fastening portion 310 clamps these members together by caulking. With such a configuration, the plate body 309 forming the negative electrode current collector 150 is mounted on the lid structural body 180. Thereafter, the first region 301 is further bent by 90 degrees such that the first region 301 is bent by approximately 180 degrees in total, that is, the region 302 and the region 303 of the plate body 309 are disposed substantially in parallel to each other.

Also on a positive electrode side, a plate body forming a positive electrode current collector 140 is mounted on the lid structural body 180, and is bent in accordance with substantially the same steps.

Thereafter, as described above, the region 303 of the plate body 309 is a portion which forms the second plate portion 1522 in the negative electrode current collector 150 and hence, a tab portion 420 of an electrode assembly 400 is fixed to the region 303 by welding.

That is, in the lid structural body assembling step, the first region 301 of the plate body 309 is further bent by approximately 90 degrees so that the negative electrode current collector 150 shown in FIG. 4 is formed. To be more specific, by bending the first region 301 such that the region 302 and the region 303 oppositely face each other, the first region 301 is formed into a curved shape thus forming a curved portion 1523.

Also on a positive electrode side, a positive electrode current collector 140 is joined to a tab portion 410 of the electrode assembly 400 in accordance with substantially the same steps.

Next, in a side spacer mounting step, side spacers 700 are mounted on a body portion 430 of the electrode assembly 400. To be more specific, the side spacer 700 is mounted on a curved portion 431 and a curved portion 432 of the body portion 430 individually. After the side spacers 700 are mounted on the body portion 430, each side spacer 700 is fixed to the body portion 430 by an adhesive tape (not shown in the drawing).

Next, in an electrode assembly housing step, the electrode assembly 400 and the side spacers 700 formed into an integral body is housed in a body 111 of a container 100. At this stage of the assembling operation, the electrode assembly 400 and the side spacers 700 are inserted into the body 111 of the container 100 through an opening 112 of the body 111.

After the electrode assembly housing step is completed, in a lid plate welding step, the lid plate 110 is welded to the body 111 so that assembling of the container 100 is completed.

Next, in an electrolyte solution filling step, an electrolyte solution is filled in the container 100 through an electrolyte solution filling port 117.

Thereafter, the electrolyte solution filling plug 118 is welded to the lid plate 110 for closing the electrolyte solution filling port 117 so that the energy storage device 10 is manufactured.

As described above, according to this embodiment, the bent portion between the first plate portion 1521 and the second plate portion 1522 is formed into the curved portion 1523 and hence, the stress concentration at the curved portion 1523 can be suppressed whereby the occurrence of cracks can be suppressed. Further, the thickness t1 of the curved portion 1523 is smaller than the thickness t2 of the first plate portion 1521 and the thickness t2 of the second plate portion 1522 and hence, it is possible to make the first plate portion 1521 and the second plate portion 1522 opposedly face each other substantially in parallel to each other. Accordingly, the negative electrode current collector 150 can be made thin as a whole.

Accordingly, it is possible to realize the stabilization of the energy storage device while forming the current collector per se in a compact shape.

The thickness t1 of the curved portion 1523 is smaller than the thickness t2 of the first plate portion 1521 and the thickness t2 of the second plate portion 1522 and hence, the width H1 of the space defined by the inner surface 1524 of the curved portion 1523 can be set larger than the distance H2 between the distal end of the first plate portion 1521 and the distal end of the second plate portion 1522. That is, it is possible to make the first plate portion 1521 and the second plate portion 1522 further approach to each other and hence, the negative electrode current collector 150 can be formed in a more compact shape.

The inner surface 1524 of the curved portion 1523 is formed into an arcuate shape in cross section and hence, the curved portion 1523 per se can be formed into a smoothly curved shape. Accordingly, the stress concentration at the curved portion 1523 can be more effectively suppressed and hence, the occurrence of cracks can be more effectively suppressed.

The inclined portions 305 are formed on the boundaries between the first region 301 and other regions 302 and 303 of the plate body 309 and hence, even when the curved portion 1523 is formed by bending the plate body 309, the bent portion minimally forms an acute angle. Accordingly, the stress concentration at the bent portion can be suppressed and hence, the occurrence of cracks can be suppressed.

The recessed portion 304 is formed on the surface 3011 of the plate body 309 which forms the inner surface 1524 of the curved portion 1523 and hence, the inner surface 1524 of the curved portion 1523 can be formed into a partially opened arcuate shape in cross section simply by bending the plate body 309. Further, the recessed portion 304 is formed on the surface 3011 which forms the inner surface 1524 of the curved portion 1523 and hence, a radius of curvature of the inner surface 1524 of the curved portion 1523 can be set large.

Another Embodiment

The energy storage device according to the present invention has been described with reference to the embodiment heretofore. However, the present invention is not limited to the above-mentioned embodiment. Configurations acquired by applying various modifications conceived by those who are skilled in the art to the embodiment, or configurations acquired by combining the above-described plurality of constitutional elements are also included in the scope of the present invention unless these configurations depart from the gist of the present invention.

In the description made hereinafter, parts identical to the parts in the above-mentioned embodiment are given the same symbols, and the description of such parts may be omitted.

For example, the number of electrode assemblies 400 which the energy storage device 10 includes is not limited to one, and may be two or more.

The electrode assembly 400 which the energy storage device 10 includes is not limited to an electrode assembly of a winding type. For example, the energy storage device 10 may include an electrode assembly of a stacking type where plates having a flat plate shape are stacked with each other. Alternatively, the energy storage device 10 may include an electrode assembly having a structure where plates having an elongated strip shape are stacked in a zigzag shape by repeatedly forming a mountain fold and a valley fold, for example.

A positional relationship between the tab portion 410 of the electrode assembly 400 on a positive electrode side and the tab portion 420 of the electrode assembly 400 on a negative electrode side is not particularly limited. For example, the tab portion 410 and the tab portion 420 may be disposed on the winding-type electrode assembly 400 on sides opposite to each other in the direction of the winding axis. When the energy storage device 10 includes an electrode assembly of a stacking type, as viewed in the stacking direction, a tab portion on a positive electrode side and a tab portion on a negative electrode side may be formed such that the tab portions project in different directions. In this case, it is sufficient that lower insulation members, current collectors and the like are disposed at positions which correspond to the tab portion on the positive electrode side and the tab portion on the negative electrode side respectively.

In the above-mentioned embodiment, the case has been exemplified as an example where the recessed portion 304 is formed on the surface 3011 of the first region 301 which forms the inner surface 1524 of the curved portion 1523. However, a recessed portion may be formed on a surface of the first region 301 on a side opposite to the surface 3011, or a recessed portion may be formed on the surface 3011 and on the surface of the first region 301 on a side opposite to the surface 3011 respectively.

In the above-mentioned embodiment, the case has been described as an example where the plate body 309 which is bent by 90 degrees in advance is mounted on the lid plate structural body 180 and, thereafter, the plate body 309 is further bent by 90 degrees. However, the present invention may include a case where a plate body 309 having a flat plate shape is mounted on the lid plate structural body 180 and, thereafter, the plate body 309 is bent by approximately 90 degrees. The present invention may also include a case where a flat plate body 309 is welded to the tab portion 420 of the electrode assembly 400 and, at the same time, the flat plate body 309 is mounted on the lid plate structural body 180 and, thereafter, the plate body 309 is bent by approximately 180 degrees.

In the above-mentioned embodiment, the case has been described as an example where the negative electrode current collector 150 is formed as an integral body constituted of the first connecting portion 151 and the second connecting portion 152. However, the negative electrode current collector 150 may be formed such that the first connecting portion 151 and the second connecting portion 152 are provided as portions separate from each other, and the negative electrode current collector 150 is formed by joining the first connecting portion 151 and the second connecting portion 152 together.

In the above-mentioned embodiment, the case has been described as an example where the wall portion 710 of the side spacer 700 has lower end portion thereof opened. However, the lower end portion of the wall portion 710 of the side spacer 700 may be closed by a bottom plate.

Configurations which are acquired by combining the above-mentioned embodiment and the above-mentioned modifications as desired are also included in the scope of the present invention.

INDUSTRIAL APPLICABILITY

The present invention is applicable to an energy storage device such as a lithium ion secondary battery.

The invention claimed is:
1. An energy, storage device, comprising:
a terminal;
an electrode assembly having a body portion and a tab portion projecting from the body portion; and
a current collector electrically connecting the terminal and the tab portion with each other,
wherein the current collector is configured such that a first plate portion and a second plate portion which oppos- edly face each other are continuously formed with each other with a curved portion interposed therebetween, wherein a thickness of the curved portion is set smaller than a thickness of the first plate portion and a thickness of the second plate portion, wherein at least a portion of an inner surface of the curved portion has an arcuate shape in cross section, wherein a width of a space defined by the inner surface of the curved portion in a direction that the first plate portion and the second plate portion opposedly face each other is set larger than a distance between a distal end of the first plate portion and a distal end of the second plate portion in the direction that the first plate portion and the second plate portion opposedly face each other, and wherein both end portions of the inner surface of the curved portion each include an inclined surface inclined in a straight line shape in a cross section.

2. A method for manufacturing the energy storage device described in claim 1, said method comprising:

providing the terminal;

providing the electrode assembly including the body portion and the tab portion projecting from the body portion; and providing the current collector to electrically connect the terminal and the tab portion with each other, wherein the current collector is formed by bending a plate body having a flat plate shape, wherein a recessed portion is formed on a surface of the first region of the plate body which forms the inner surface of the curved portion, wherein the curved portion is formed by bending a first region having a smaller wall thickness than other regions of the plate body, and wherein inclined portions, where the wall thickness is gradually decreased toward the first region, are formed on boundaries between the first region and the other regions of the plate body.

3. An energy storage device, comprising:

a terminal;

an electrode assembly having a body portion and a tab portion projecting from the body portion; and a current collector electrically connecting the terminal and the tab portion with each other, wherein the current collector is configured such that a first plate portion and a second plate portion which opposedly face each other are continuously formed with each other with a curved portion interposed therebetween, wherein a thickness of the curved portion is set smaller than a thickness of the first plate portion and a thickness of the second plate portion, wherein a width of a space defined by an inner surface of the curved portion in a direction that the first plate portion and the second plate portion opposedly face each other is set larger than a distance between a distal end of the first plate portion and a distal end of the second plate portion in the direction that the first plate portion and the second plate portion opposedly face each other, and wherein both end portions of the inner surface of the curved portion each have an inclined surface inclined in a straight line shape in cross section.

* * * * *